United States Patent Office 3,167,116
Patented Jan. 26, 1965

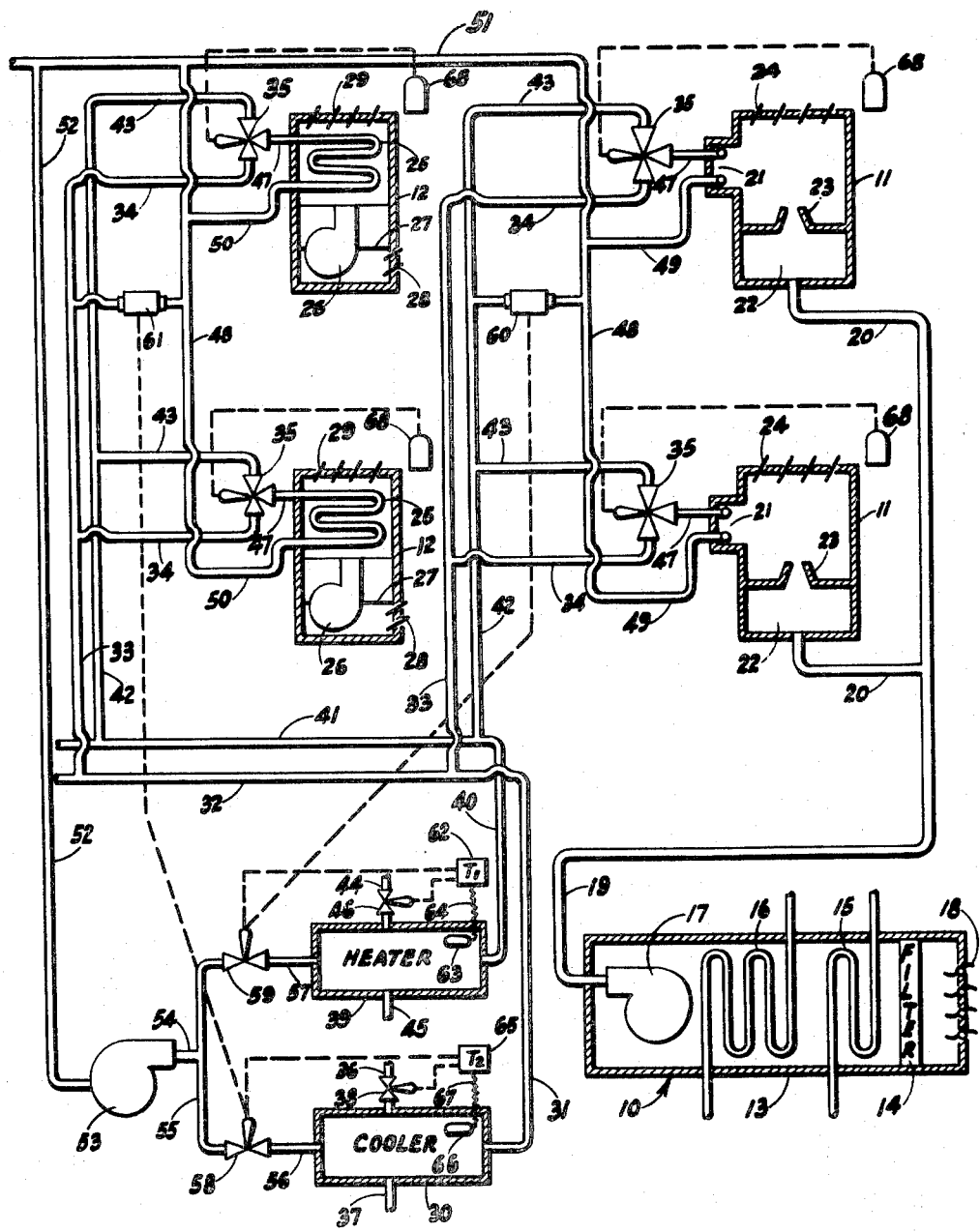

3,167,116
AIR CONDITIONING SYSTEMS
Charles W. Egbert, Springettsbury Township, York County, Pa., assignor to Borg-Warner Corporation, Chicago, Ill., a corporation of Illinois
Filed Mar. 21, 1960, Ser. No. 16,207
8 Claims. (Cl. 165—22)

This invention relates to improvements in air conditioning systems and, more particularly, to improvements in the type of air conditioning system as set out in the application of Robert D. Blum, Serial No. 710,751, filed January 23, 1958, now Patent No. 3,024,008, granted March 6, 1962, assigned to the assignee of this invention.

In a system as set out in the Blum application, various rooms within a building to be conditioned are provided with room conditioning units. These units are simultaneously supplied with both heated and chilled water (heat-exchange fluid) for flow through the unit, depending on whether it is desired to heat or cool the particular room. The heated or chilled water returning from the room units all mix in a common return line. Part of the mix is routed to a water cooler and part to a water heater. This invention specifically relates to a method of insuring that the flow of water through a room unit is limited to a quantity not materially exceeding the peak design flow rate, and secondly to a quantity not exceeding that which the system is capable of providing at the proper temperatures.

Generally speaking, an increased flow of water through a unit conditioner beyond its normal flow rate results in but very slight increase in capacity. Therefore, under ordinary circumstances, any increased flow rate can be tolerated. However, with the type of system as disclosed herein, an increased flow of water through a room unit can penalize overall operating costs by mixing excess of water quantities in a common return.

In the type of system as disclosed herein, it is mandatory that any water flowing in the hot water line be above room temperature, and that any water flowing in the cold water line be below room temperature. For example, if we assume that there has been a failure of the steam supply to the hot water heater during warm weather, then we would have relatively cool water in the hot water supply line. Should the automatic control valve on a room unit be calling for heating, it would actually be admitting to the unit coil a flow of relatively cool water, which would aggravate the conditions obtaining within the room.

A principal object of the invention, therefore, is to insure that in an air conditioning system of the type wherein both heated and chilled water are simultaneously supplied to a room unit that the heated water be supplied at a temperature above the design temperature, and the chilled water be supplied at a temperature below the design temperature. Yet another object of the invention is to provide, in a system of the type just above-mentioned, a method of maintaining a reasonably constant pressure differential between the supply and return risers at the room unit to limit the flow of water through the room unit to a desired amount. This will insure that an excess flow rate will not be obtained through a room unit coil to the detriment of the system balance.

The invention consists of the novel constructions, arrangements and devices to be hereinafter described and claimed for carrying out the above-stated objects and such other objects as will appear from the following description of preferred embodiments of the invention described with reference to the accompanying drawings, in which:

The single figure is a schematic representation of the herein-disclosed air conditioning system.

Turning now to the figure, a building to be conditioned is provided with a primary air conditioner 10 and a plurality of room units, which may take the form of so-called "induction" units 11, or "fan coil" units 12, with a unit 11 or 12 being in air communication with each space to be conditioned. The choice of a unit 11 or 12 will depend on varying circumstances, which need not be elaborated on here; suffice it to say that the invention is applicable to either.

Primary air conditioner 10 comprises a casing 13, in which is located a filter 14, a preheater 15, a dehumidifier coil 16, and a fan 17 of any conventional type. Fan 17 is generally of a constant speed type and of sufficient capacity to provide for the necessary air velocity at a unit 11 to provide a desired induction effect on the room air when the supply air is discharged within the unit. Air inlet louvers 18 are provided in the casing 13 for controlling the flow of air therethrough. A discharge conduit 19 and branch conduits 20 are provided for connecting the fan to the various units 11. It will be appreciated that primary air conditioner 10 is needed only in those buildings utilizing induction units 11.

Each induction unit 11 contains a heat-exchange coil 21, a plenum chamber 22, an air discharge nozzle 23, and also an air outlet 24 from which the air is discharged into the room to be conditioned.

Fan coil units 12 comprise a heat-exchange coil 25 and a fan 26, supported by any suitable means such as a baffle 27. Air from the room to be conditioned is drawn into the unit 12 by way of inlet openings 28 and is discharged therefrom by way of discharge openings 29.

A chilled water circuit and a heated water circuit are provided for simultaneously supplying chilled and heated water to the units 11 and 12.

The chilled water circuit includes a cooler 30, connected by way of a discharge line 31 to a chilled water supply header 32. A plurality of take-off risers 33 lead from header 32 to the various parts of the building that need conditioning. Lines 34 lead from risers 33 to the cold water inlet of a unit water control valve 35. A supply line 36 and a discharge line 37 are provided in cooler 30 for circulating any desired fluid through the cooler to chill the water flowing therethrough. A throttling valve 38 is provided in supply line 36 for regulating the flow of fluid through the cooler.

The heated water circuit comprises a heater 39, connected by way of a discharge line 40 to a heated water supply header 41. A plurality of heated water risers 42 lead from header 41. Take-off lines 43 lead from risers 42 to the heated water inlet of valves 35. A supply line 44 and a discharge line 45 are provided in heater 39 for circulating any desired fluid through the heater to heat the water flowing therethrough. Supply line 44 has a throttling valve 46 therein for controlling the supply of heated fluid supplied heater 39.

From valves 35 a discharge line 47 leads to coil 21 or 25, as the case may be. Mixed water return lines 48 are provided and are connected to the outlet of coils 21 by way of lines 49 and to the outlet of coils 25 by lines 50. Return lines 48 lead to a return water header 51. From header 51 a pump inlet line 52 leads to a water pump 53, which supplies the necessary pressure to provide for water flow for both the chilled water and heated water circuits. It will be appreciated that instead of a single pump 53, two pumps in parallel could be utilized. From pump 53 a discharge line 54 leads to a pump header 55. From the pump header 55 a supply line 56 leads to cooler 30, and a supply line 57 leads to the heater 39. Supply line 56 has a throttling valve 58 therein, and supply line 57 has a throttling valve 59 therein.

A pressure differential controller 60 is connected between a heated water riser 42 and a mixed water return line 48. A second pressure differential controller 61 is connected between a chilled water riser 33 and a mixed water return line 48. Pressure differential controller 60 is operative to regulate valve 59, while pressure differential controller 61 is operative to regulate valve 58.

A thermostatic control 62 is provided having the usual bulb 63 attached thereto by way of a capillary 64. Bulb 63 is in heat-exchange relation with the water being heated in heater 39 to sense the temperature of the heated water as it is discharged from the heater. Thermostatic control 62 is operative to control valve 46, and is further operative to control valve 59 along with pressure controller 60.

A second thermostatic control 65 is provided, having a heat-exchange bulb 66 operatively connected thereto by way of a capillary 67. Bulb 66 is in heat-exchange relation with the water being chilled in cooler 30, to sense the temperature of the chilled water leaving the cooler. Thermostatic control 65 is operative to control the throttling valve 38, and is further operative to control throttling valve 58 co-jointly with pressure differential controller 61.

A thermostat 68 is provided for each unit 11 or 12 to control each valve 35 to thereby supply either heated or chilled water to a particular coil, dependent on the temperature then obtaining in the particular room.

Operation

During the greater part of the year, the outside temperature is such that some rooms will require cooling (sunlit rooms, for example), while others will require heating (shaded rooms, for example).

For those rooms requiring cooling, water chilled in cooler 30 flows by way of line 31 to header 32. The chilled water exits header 32 by way of risers 33 and thence flows by way of lines 34 to valves 35. Thermostats 68 position valves 35 in such a manner that no heated water flow is permitted and chilled water only is allowed to pass through coils 21 and 25. Valves 35 are modulating, dependent on the amount of cooling required in any particular room.

For those rooms requiring heating, water heated in heater 39 flows by way of lines 40 to heated water header 41, whence the water flows into risers 42 and lines 43 to the heated water inlet of valves 35. Thermostats 68 position valves 35 in such a manner that no chilled water flow is permitted and heated water only is allowed to pass through coils 21 and 25. Valves 35 again are modulating, dependent on the amount of heating required in any particular room.

Returned water, whether heated or chilled, flows through lines 49 or 50 respectively into the common return lines 48 and thence into return header 51. From header 51, the return water flows through line 52 to pump 53 from whence it discharges through line 54 into header 55. Part of the water then flows through line 56 into cooler 30, and part through line 57 into heater 39.

In those rooms served by fan coil units 12, room air enters the units by way of inlet openings 28 under the influence of fans 26. The room air then flows over coils 25, giving up its heat to the chilled water flow within the coils, or picking up heat from the heated water flowing therethrough. The room air then exits the unit by way of discharge openings 29 for return to the rooms.

With respect to the induction units 11, outside air is drawn into primary air conditioner 10, purified by filter 14 and dehumidified in passing over coil 16. Coil 16 is supplied with a chilled heat-exchange fluid derived from any suitable source. The primary air is then delivered under the influence of fan 17 to the various induction units by way of conduit 19 and branch conduits 20. The primary air then flows through nozzles 23 and in so doing, induces a flow of room air through coils 21. The room air gives up its heat to the chilled water flowing through coils 21, or picks up heat from the heated water flow and then mixes with the incoming primary air for return to the room by way of outlets 24.

Pressure differential controller 60 is connected across a heated water supply riser 42 and adjacent common return line 48 on the north side of the structure. This controller is set to provide adequate pressure differential to assure design flow through each room unit whenever the unit control valve 35 opens to call for heating. During warm weather, as the requirement for hot water decreases, then pressure losses due to friction in the piping will likewise decrease. There will be times when the losses due to friction will be almost negligible. This means that a full pumping head can be felt across the hot water connections at the room units. If no method were provided of throttling heated water flow under this condition of operation, there would be tremendous flow of heated water through the particular room unit coil for which heating was required. This would provide for a flow of heated water through the room units in a quantity materially exceeding that required, to the detriment of the system balance when this water mixes with the cold return water. Pressure differential controller 60, by throttling valve 59, will maintain a reasonably constant pressure differential available at the units.

In a like manner, pressure differential controller 61, connected between a chilled water supply riser 33 and a common return line 48, maintains a reasonably constant pressure differential that will assure full flow of cold water through a room unit when a valve 35 calls for full cooling. Pressure controller 61 will throttle valve 58 during cold weather when friction losses will be slight and a full pumping head will be felt across the cold water connections.

With the type of air conditioning system, as disclosed herein and as was pointed out above, it is mandatory that any water flowing in the hot water line be above room temperature and that any water flowing in the cold water line be below room temperature. For example, assume that there has been a failure of the heat-exchange fluid supplied to the heater 39 during warm weather. Then we would have relatively cool water in the heated water supply line. Should a valve 35 call for heating under the influence of a thermostat 68, it would actually admit to the unit coil a flow of relatively cool water. Thermostatic control 62 normally controls heat-exchange fluid flow through valve 46 to maintain the desired hot water temperature leaving the heater 39. Should the water temperature leaving the heater 39 drop below the setting of thermostat 62 (due to an inadequate supply of heat-exchange fluid) then, after fully opening valve 46, this same thermostat will then begin to throttle the flow of water through valve 59. If no heat is available, thermostat 62 will completely close valve 59. This gives proper assurance that any water flowing to the room units 11 or 12 through the heated water circuit, will be at the proper temperature. When there is no heat available, there will be no flow through the heated water circuit and, therefore, when a room unit calls for hot water there is no possibility that unwanted cooling will be delivered. In essence, the flow of heated water is limited to the quantities which the equipment is capable of heating to the design temperature.

The same arrangement is used for the chilled water circuit. Thermostat 65 controls the flow of heat-exchange fluid supplied cooler 30 by way of supply line 36. Upon a rise in the temperature of the chilled water leaving cooler 30 by way of line 31, as sensed by bulb 66, thermostat 65 will first open valve 38 to provide maximum flow of chilled heat-exchange fluid through the cooler 30. Should the chilled water temperature continue to rise, as felt by bulb 66 due to inadequate refrigeration capacity, then thermostat 65 will throttle valve 58 to reduce the flow of chilled water through the cooler 30. In the event of a refrigeration failure during warm weather, resulting in no cooling being available, then thermostat 65 will completely close valve 58 so that there will be no flow through the chilled water circuit until refrigeration again becomes available. As with the heated water, so the chilled water flow is limited to a quantity which is capable of being chilled to the design temperature.

Both the pressure sensors 60 and 61 and the temperature sensors 62 and 65 both operate on valves 58 and 59. However, temperature sensors 62 and 65 are dominant in that they override the action of sensors 60 and 61 to maintain valves 58 and 59 closed in the event there is no chilled or heated water respectively.

It will be appreciated that pump 53 will be of the type which will automatically shut down in the event there is no fluid flow throughout the system; that is, should there be no heating or cooling called for, or should both valves 58 and 59 be closed.

As used herein, the term "water" means any suitable heat-exchange liquid or brine which may be used effectively as a heat-exchange medium.

I wish it to be understood that my invention is not to be limited to the specific constructions and arrangements shown and described, except only insofar as the claims may be so limited, as it will be apparent to those skilled in the art that changes may be made without departing from the principles of the invention.

What is claimed is:

1. In an air conditioning system for multi-room buildings of the type comprising a plurality of heat-exchange coils in air communication with respective rooms, means for simultaneously supplying a heated liquid and a chilled liquid to said coils for individual flow therethrough, said means including a heated liquid supply line and a chilled liquid supply line, means for heating and cooling said heated and chilled liquids, and a common line communicating with said coils for returning said heated liquid and said chilled liquid flowing through said coils to said heating and cooling means, the improvement comprising means for maintaining a substantially constant pressure differential between said heated liquid supply line and said common return line and means for maintaining a substantially constant pressure differential between a chilled liquid supply line and said common return line.

2. In an air conditioning system as set out in claim 1, the further improvement comprising means for maintaining the heated liquid and chilled liquid at a predetermined temperature; and means for throttling the flow of said heated liquid or chilled liquid through said supply lines when said heating means or cooling means is inoperative to maintain said predetermined temperatures.

3. In an air conditioning system as set out in claim 1, the further improvement comprising means for maintaining the heated liquid above a building design temperature and for maintaining the chilled liquid below said design temperature; means for preventing flow of heated liquid through said heated liquid supply line when said heating means is inoperative to maintain the temperature of said liquid above said design temperature; and means for preventing flow of chilled liquid through said chilled liquid supply line when said cooling means is inoperative to maintain the temperature of said chilled liquid below said design temperature.

4. An air conditioning system for multi-room buildings comprising a plurality of heat-exchange coils in air communication with respective rooms; means for flowing room air over said coils in heat-exchange relation therewith; a chilled liquid circuit, including cooling means for supplying a chilled liquid to said coils; a heated liquid circuit, including heating means for simultaneously supplying a heated liquid to said coils; valve means for controlling the flow between said chilled and heated liquid circuits and said coils; a common return line for return flow of said liquids from said coils to said heating and cooling means; and means operative to limit the maximum flow of either chilled or heated liquid through said valve means.

5. The air conditioning system as set out in claim 4, wherein said last mentioned means comprises a first pressure differential control for maintaining a substantially constant pressure between said chilled liquid circuit and said common return line, and a second pressure differential control for maintaining a substantially constant pressure between said heated liquid circuit and said common return line.

6. The air conditioning system as set out in claim 4, including a first throttling valve in said chilled liquid circuit and a second throttling valve in said heated liquid circuit; means for actuating said first valve to throttle the flow of chilled liquid through said chilled liquid circuit, according to the temperature of said chilled liquid; and means for actuating said second valve to throttle the flow of heated liquid through said heated liquid circuit according to the temperature of said heated liquid.

7. In an air conditioning system as set out in claim 1, the further improvement comprising means for maintaining the heated liquid and chilled liquid at a predetermined temperature; and means for limiting the flow of heated or chilled liquid through said supply lines to a quantity capable of being heated or chilled to said predetermined temperature.

8. An air conditioning system for multi-room buildings comprising a plurality of heat-exchange coils in air communication with respective rooms; means for flowing room air over said coils in heat-exchange relation therewith; a chilled liquid circuit including cooling means for supplying a chilled liquid to said coils; a heated liquid circuit including heating means for simultaneously supplying a heated liquid to said coils; a common return line for flow of liquid from said coils to said heating means and cooling means; means for maintaining the heated liquid at a predetermined temperature above a building design temperature; means for maintaining the chilled liquid at a predetermined temperature below said building design temperature; means for throttling the flow of heated liquid through said heated liquid supply line when said heating means is inoperative to maintain said predetermined temperature and for preventing the flow of heated liquid when said heating means is inoperative to maintain the temperature of said liquid above said design temperature; means for throttling the flow of chilled liquid through said chilled liquid supply line when said cooling means is inoperative to maintain said predetermined temperature and for preventing the flow of said chilled liquid when said cooling means is inoperative to maintain the temperature thereof below said design temperature; means for maintaining a substantially constant pressure differential between said heated liquid circuit and said common return line; and means for maintaining a substantially constant pressure differential between said chilled liquid circuit and said common return line.

References Cited by the Examiner

UNITED STATES PATENTS

| | | | |
|---|---|---|---|
| 1,787,686 | 1/31 | Kerr | 137—501 |
| 2,008,568 | 7/35 | Snavely | 237—8 |
| 2,012,067 | 8/35 | Mayo | 236—9 |
| 2,683,582 | 7/54 | Kerr | 62—177 X |
| 2,710,724 | 6/55 | McMahon | 165—31 |
| 2,788,264 | 4/57 | Bremer et al. | 165—35 |
| 2,796,740 | 6/57 | McFarlan | 165—29 X |
| 2,813,406 | 11/57 | Smith | 165—57 X |
| 2,868,461 | 1/59 | Goddis | 236—9 |
| 2,935,857 | 5/60 | McFarlan | 165—57 X |
| 2,942,785 | 6/60 | Arbogast | 137—183 |
| 3,024,008 | 3/62 | Blum | 165—26 X |

CHARLES SUKALO, *Primary Examiner*.

HERMAN BERMAN, HERBERT L. MARTIN, PERCY L. PATRICK, *Examiners*.